United States Patent [19]
Chrestoff et al.

[11] Patent Number: 5,829,338
[45] Date of Patent: Nov. 3, 1998

[54] PUMP HAVING UNIDIRECTIONAL TAPERED LAND THRUST BEARING CLUSTER

[75] Inventors: Brian M. Chrestoff, Sidney, Ohio; Robert H. Ash, Jr., Humble, Tex.

[73] Assignee: FMC Corporation, Chicago, Ill.

[21] Appl. No.: 811,084

[22] Filed: Mar. 3, 1997

[51] Int. Cl.$^6$ ................................. F01B 3/00; F16C 32/06
[52] U.S. Cl. .............................. 92/12.2; 92/71; 417/269; 384/121
[58] Field of Search ................................. 92/12.2, 57, 71; 417/264, 222.1; 74/60; 384/121, 123, 303

[56] References Cited

U.S. PATENT DOCUMENTS

| | | | |
|---|---|---|---|
| 3,565,498 | 2/1971 | Leopard et al. | |
| 4,225,196 | 9/1980 | Gray | 384/121 X |
| 4,348,065 | 9/1982 | Yoshioka et al. | 384/121 |
| 4,383,771 | 5/1983 | Freytag et al. | 384/121 |
| 4,726,695 | 2/1988 | Showalter | 384/121 |
| 4,728,201 | 3/1988 | Abbe | 384/121 |
| 4,777,838 | 10/1988 | Aarestad | 384/121 X |
| 5,013,219 | 5/1991 | Hicks et al. | 417/269 |

Primary Examiner—Hoang Nguyen
Attorney, Agent, or Firm—Henry C. Query, Jr.

[57] ABSTRACT

This invention pertains to a single-piece unidirectional tapered land thrust bearing cluster for use in high-pressure positive-displacement swashplate piston pumps and the like. The bearing cluster has a plurality of identical bearing pads integral to the bearing cluster. Each bearing pad includes a tapered section, a flat section and a fluid communicating slot integral therewith. During operation of the pump the swashplate camming surface rotates relative to the bearing cluster which develops a pressurized load-carrying hydrodynamic film of decreasing thickness and increasing strength between a back plate of the rotating swashplate and the bearing cluster.

14 Claims, 3 Drawing Sheets

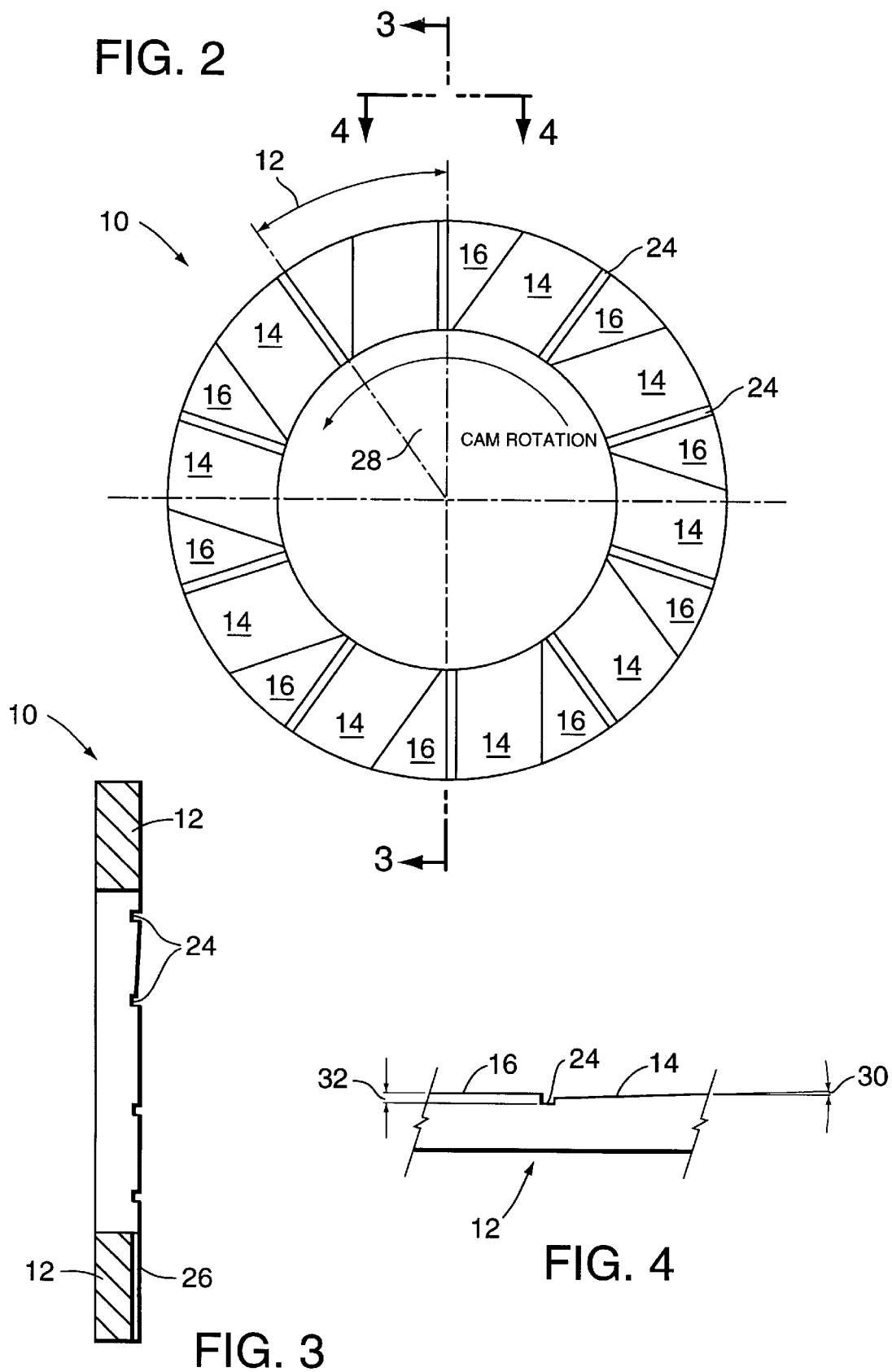

PUMP HAVING UNIDIRECTIONAL TAPERED LAND THRUST BEARING CLUSTER

BACKGROUND OF THE INVENTION

This invention relates to high-pressure positive-displacement swashplate piston pumps configured with a thrust bearing apparatus for the swashplate, and more particularly to a high-pressure positive-displacement swashplate piston pump having a single-piece unidirectional tapered land thrust bearing cluster with water lubrication.

Large high-pressure positive-displacement piston pumps made from composite materials are capable of continuous operation at high speeds and high pressures. Typically these pumps operate at pressures on the order of 1,000 psi. These types of pumps require multiple pistons to reach this performance and consequently require the use a thrust bearing to oppose the thrust of each piston as the pump's swashplate forces each piston upward through its piston stroke. Certain of these types of prior art pumps have a thrust bearing manufactured from a material sold under the brand name Torlon 4301, and an associated mounting pad fabricated of 75D durometer polyurethane. The thrust bearing and the associated mounting pad are glued together. During operation of the pump, under the influence of the rotating camshaft, the thrust bearing will tilt and create a pressurized load-carrying hydrodynamic film of water which will provide the separation of the two surfaces, and accordingly reduce friction between the two surfaces. But when this pump is operated at its maximum allowable water inlet temperature of 100° F., the loss in the underlying mechanical properties of the materials results in the thrust bearing coming free of its respective mounting pad(s) when the glue holding the thrust bearing to the mounting pad melts. Eventually, significant damage to the other vital components of the pump results.

One possible solution to this particular reliability problem with pumps utilizing a construction having a multiple-piece thrust bearing and pad assembly when the pump is expected to operate at its maximum allowable water inlet temperature in the 73° F. to 100° F. temperature range, is to modify the pump configuration and resulting construction to utilize a standard, conventional parallel or conventional flat plate type of thrust bearing, rather than the multiple-piece thrust bearing and pad assembly presently used by the pump. However, this different design approach will not work effectively in larger pumps because the thrust bearing is not able to develop the required pressurized load-carrying hydrodynamic film of water or lubricant of sufficient pressure and thickness to support the greater loads which these larger pumps are required to handle.

Another possible solution to this pump reliability problem is to redesign, manufacture, or construct a more reliable, single-piece cluster for a unidirectional tapered land thrust bearing that will not present an operational problem for the pump when the pump is operated at its maximum allowable water inlet temperature. A single-piece construction of a unidirectional land thrust bearing cluster that is also tapered is simpler and easier to manufacture than the current multi-piece construction. Rotation of the swashplate in the direction of decreasing film thickness will facilitate sufficient pressurized load-carrying hydrodynamic film between the opposing surfaces. Additionally, it would also be advantageous if this single-piece unidirectional tapered land thrust bearing cluster is also capable of being injection molded using suitable polymer materials.

A further underlying problem associated with the construction of large high-pressure positive-displacement piston pumps is that these pumps require several thrust bearings to support the swashplate. One type of pump contained in the prior art uses seven two-piece tilting thrust bearings and thrust bearing pad assemblies to support the rotating swashplate. Each flat opposing surface within the pump requires either lubrication, a sufficient load-carrying hydrodynamic film or other fluid bearing elements to dissipate or eliminate the accompanying friction. Further, it would be advantageous if a high-pressure positive-displacement piston pump could overcome the various problems enumerated herein which are associated with the pumps that are found in the prior art.

The present invention overcomes these and other problems that are inherent with existing high-pressure positive-displacement piston pumps having a multiple-piece thrust bearing and pad assemblies. The present invention utilizes a novel single-piece unidirectional tapered land thrust bearing cluster which produces a lubricating load-carrying pressurized hydrodynamic film of sufficient pressure and thickness when the pump is operated. This bearing cluster apparatus may be either machined or injection-molded as a single-piece construction.

SUMMARY OF THE INVENTION

The principal object of the present invention is to provide a novel unidirectional tapered land thrust bearing cluster having a more reliable single-piece design and construction for utilization with an associated high-pressure positive-displacement piston pump.

Another object of the present invention is to provide a single-piece unidirectional tapered land thrust bearing cluster that is highly reliable and is inexpensive to manufacture.

A further object of the present invention is to provide a single-piece unidirectional tapered land thrust bearing cluster that may be either machined or injection-molded.

A still further object of the present invention is to provide an improved high-pressure positive-displacement piston pump that utilizes a continuous unidirectional tapered land thrust bearing cluster having a single-piece design and construction which will improve the pump's durability under the pump's expected operating conditions.

In accordance with this invention, there is provided a high pressure positive displacement swashplate pump, the pump comprising: a pump housing; an inlet communicating with an inlet pressure chamber in the pump housing; an outlet communicating with an outlet chamber in the pump housing; means for supplying fluid to the inlet; the housing including a plurality of cylinders therein communicating with the inlet and the outlet; pistons reciprocally moveable in the cylinders, each piston having an upper pressure surface at one end thereof moveable to a position adjacent a corresponding inlet and outlet pressure chamber, each piston having a piston head at a second end thereof; a rotating swashplate engaging each piston head to drive the pistons reciprocally in each cylinder to force fluid under pressure to the outlet; and a tapered land thrust bearing cluster operatively disposed in the interior pressure chamber of the pump in a recess disposed in the pump housing, the recess adapted to receive the tapered land thrust bearing cluster and disposed adjacent to and beneath the back surface of the swashplate, the tapered land thrust bearing cluster comprising a plurality of associated flat bearing pad portions which make contact with the back surface of the swashplate. The tapered land thrust bearing also includes a plurality of tapered surface segments adjacent the flat bearing pad portions to develop a hydrodynamic film between the thrust bearing and the rotating swashplate of sufficient thickness to support the loads during the pressure stroke of each piston.

These and other objects and advantages of the present invention will be clarified in the following description of the preferred embodiment in connection with the drawings, the disclosure and the appended claims, wherein like reference numerals represent like elements throughout.

DESCRIPTION OF THE DRAWINGS

FIG. 2 is a top plan view of the unidirectional tapered land thrust bearing cluster of the present invention.

FIG. 3 is a cross-sectional elevation view of the unidirectional tapered land thrust bearing cluster depicted in FIG. 2 along line 3—3.

FIG. 4 is a detailed elevation view of the unidirectional tapered land thrust bearing cluster depicted in FIG. 2 along line 4—4.

DESCRIPTION OF THE PREFERRED EMBODIMENT

In accordance with the present invention, a single-piece unidirectional tapered land thrust bearing cluster for use in a high-pressure positive-displacement swashplate piston pump is described that provides distinct advantages when compared to those of the prior art. The invention can best be understood with reference to the accompanying drawing figures.

Figure 1:
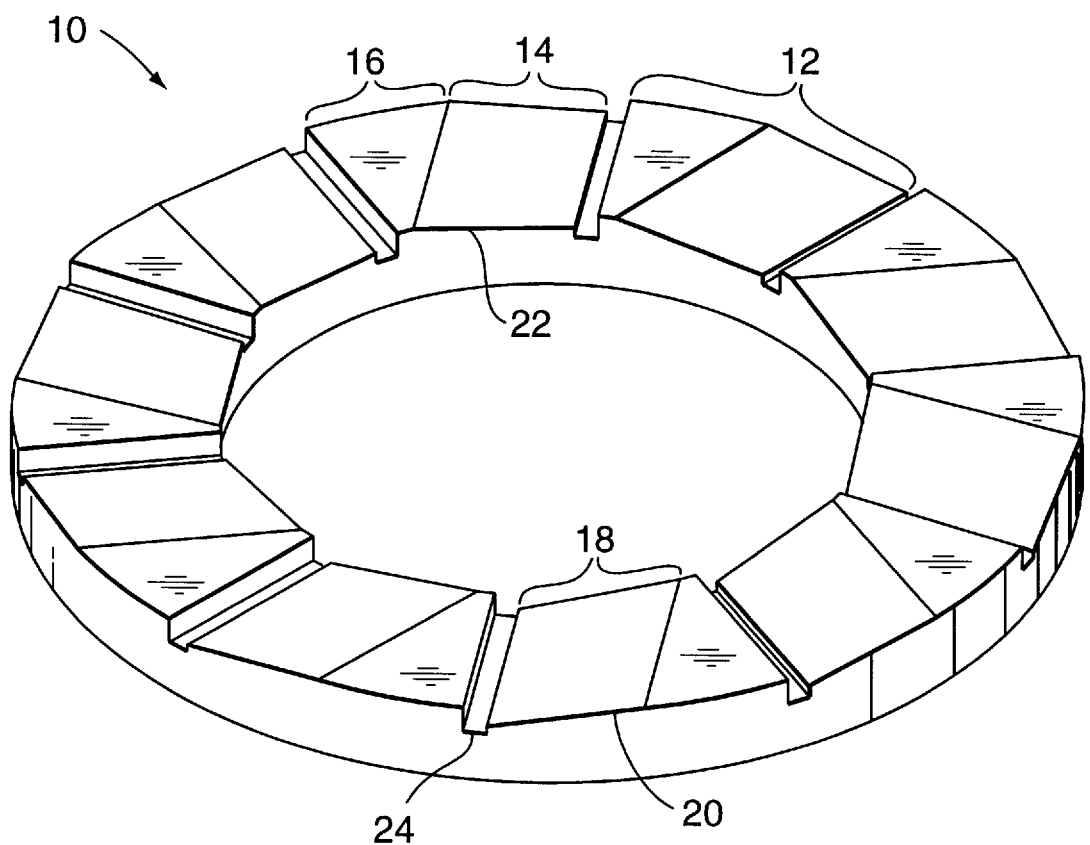
FIG. 1 is a perspective view of the unidirectional tapered land thrust bearing cluster of the present invention showing the flat and tapered surfaces of the thrust bearing.

FIG. 1 is a perspective view of the unidirectional tapered land thrust bearing cluster 10 constructed in accordance with the present invention. The single-piece unidirectional tapered land thrust bearing cluster 10 eliminates the need for individual and separate thrust bearings and pad assemblies that are presently used in an associated high-pressure positive-displacement swashplate pump 100 (FIG. 5), thereby improving the reliability and performance of the associated pump 100. For reliability purposes, it is advantageous to have a single-piece construction for the unidirectional tapered thrust bearing cluster 10, rather than separate thrust bearing and individual pad assemblies. This change in the construction for the associated thrust bearing and pad assembly eliminates the possibility, during the operation of the pump, that an individual thrust bearing will crack and become free of its mounting pad and damage other vital pump components.

In the preferred embodiment, the unidirectional tapered land thrust bearing cluster 10 is positioned underneath the back of the pump's swashplate in a recess that is positioned in the back plate of the pump 100 (FIG. 5), as will be described in further detail.

In FIG. 1, the single-piece construction of the unidirectional tapered land thrust bearing cluster 10 incorporates a plurality of individual bearing pads 12 integral to the bearing cluster 10. Each of the associated bearing pads 12 are evenly-spaced about the circular unidirectional tapered land thrust bearing cluster 10. In the preferred embodiment there are ten integral bearing pads 12 in the unidirectional tapered land thrust bearing cluster 10, as depicted in FIG. 1, although any number of bearing pads 12 may be employed.

Each of the bearing pads 12 in the unidirectional tapered land thrust bearing cluster 10 comprises an associated integral rectangular-shaped tapered section 14 and associated integral flat non-tapered section 16. Additionally, adjacent each bearing pad 12, the surface of the bearing cluster 10 is machined or otherwise profiled to provide the bearing pad 12 with an integral convergent lubricant path or slot 24. Each tapered section 14 has a tapered rise portion 18 that is the same at the outside diameter 20 as it is at the inside diameter 22 of the bearing cluster 10. Each fluid feed slot 24 will facilitate the development of a hydrodynamic pressure zone along the length of the tapered rise portion 18. Note that the rotation of the swashplate 25 of the pump 100 in the direction of decreasing film thickness (e.g., counterclockwise or left-hand rotation as shown in FIG. 2) will facilitate sufficient pressurized load-carrying hydrodynamic film to be present to support pressure on the swashplate.

In the preferred embodiment, the unidirectional tapered land thrust bearing cluster 10 comprises a single-piece construction, either machined or injection-molded. In the event the unidirectional tapered land thrust bearing cluster 10 is machined, the cluster 10 is easier to manufacture by using a common machining technique that enables the machinist to cut each tapered segment 14 of the bearing cluster 10 in a single pass on a milling machine. In the event of injection molding, the unidirectional tapered land thrust bearing cluster 10 may be manufactured from material sold under the brand name Arlon 1555 PEEK, or other suitable material.

In the preferred embodiment, it has been determined that during operation of the pump 100, rotation of the pump's swashplate 25 (FIG. 5) in the direction of decreasing film thickness will facilitate sufficient pressurized load-carrying hydrodynamic film between the unidirectional tapered land thrust bearing cluster 10 and the rear face of the swashplate 25. Further, the unidirectional tapered land thrust bearing cluster 10 is able to develop a load-carrying hydrodynamic fluid film of pressure or thickness sufficient to support the associated swashplates of much larger pumps having multiple pistons (e.g., between five to twelve pistons depending on the size of the pump 100).

FIG. 2 is a top plan view of the unidirectional tapered land thrust bearing cluster 10 constructed in accordance with the present invention depicting the flat and tapered surfaces of the thrust bearing and schematically depicting the left hand rotation of the cam or swashplate 25. In FIG. 2, the illustrated embodiment of the bearing cluster 10 has ten individual bearing pads 12 with the same geometries. Accordingly, in the preferred embodiment, each bearing pad 12 will have an associated coterminous angle 28 from the center of the bearing cluster 10 of about 36 degrees, while each of the rectangular-shaped tapered sections 14 will have about a 1.5 degree tapered surface, and each of the flat non-tapered sections 16 will have preferably a one-half inch thickness.

FIG. 3 is a cross-sectional elevation view of the unidirectional tapered land thrust bearing cluster 10 depicted in FIG. 2 taken along line 3—3. The slots 24 in the surface of the bearing cluster 10 facilitate the introduction of the lubrication between the bearing cluster 10 and the swashplate 25 which leads to the creation of a pressurized load-carrying hydrodynamic film. For each bearing pad 12 of the bearing cluster 10 there will be an associated transition section 26 depicting where the bearing pad 12 transitions from its flat non-tapered section 16 to its rectangular-shaped tapered section 14.

FIG. 4 is a detailed elevation view of one embodiment of the unidirectional tapered land thrust bearing cluster depicted in FIG. 2 along line 4—4. In FIG. 4, each bearing pad 12 of the bearing cluster 10 has a rectangular-shaped tapered section 14 and a flat non-tapered section 16. In the preferred embodiment, the rectangular-shaped tapered section 14 has about a 0.25 degree tapered surface 30, which results in about a 0.003 to 0.005 inch height difference 32 when contrasted to the flat non-tapered section 16 of the bearing pad 12. Each fluid feed slot 24 is preferably approximately 0.06 inch deep and 0.25 inch wide.

Figure 5:
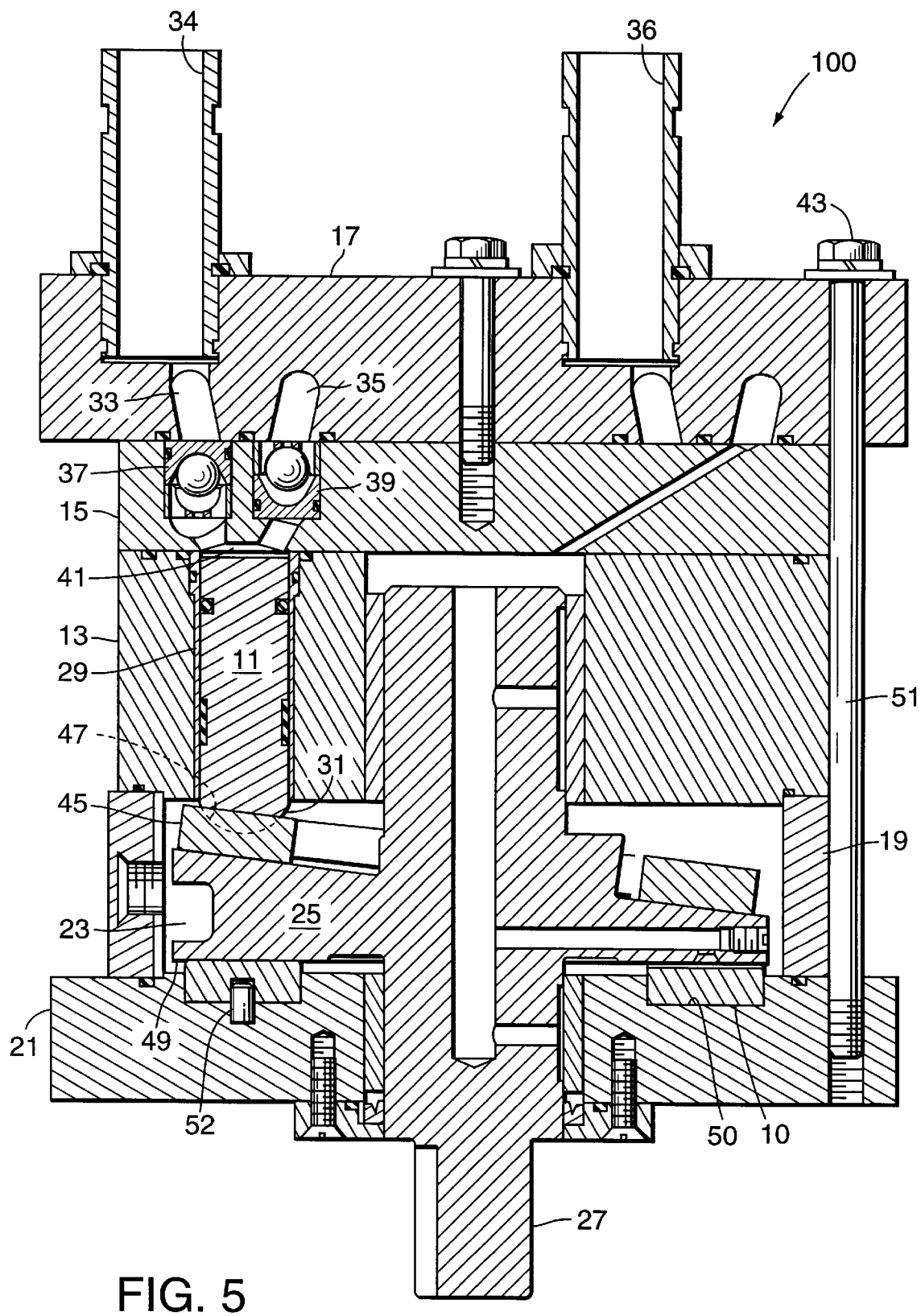
FIG. 5 is a cross-sectional view of a high-pressure positive-displacement swashplate piston pump incorporating the single-piece unidirectional tapered land thrust bearing cluster of the present invention.

FIG. 5 is a cross-sectional view of a high-pressure positive-displacement swashplate piston pump 100 configured with the single-piece unidirectional tapered land thrust bearing cluster 10 disposed between the back face 49 of swashplate 25 and pump back plate 21. Preferably, bearing cluster 10 is disposed in an annular groove 50 formed in back plate 21. Furthermore, bearing cluster 10 is preferably held in position in groove 50 by a stainless steel pin 52 positioned in opposing holes formed in bearing cluster 10 and back plate 21. Only a single piston 11 is illustrated in the pump 100, although pump 100 generally includes as few as five and as many as twelve pistons. In FIG. 5, a pump body 13 is capped with a check valve housing 15. The check valve housing 15 is capped by a gallery 17. A cam spacer 19 supports the pump body 13 away from pump back plate 21 providing a pressure chamber or cavity 23 for swashplate 25, which is rotatively driven by a driveshaft 27. Hex nuts 43 and bolts 51 securely hold the gallery 17, the check valve housing 15, the pump body 13, cam spacers 19 and back plate 21 together.

When the pump 100 is not in operation, swashplate 25 will rest on each of the separate bearing pads 12 (see FIG. 1) which are integral to the unidirectional tapered land thrust bearing cluster 10.

Operation of the pump 100 and bearing cluster 10 is as follows. Fluid to be pumped will enter the pump 100 through inlet channel 33 and is expelled under pressure out of the pump through outlet channel 35 under pressure created by the upward stroke of pistons 11. Each piston 11 has an inlet channel 33 and an outlet channel 35 associated therewith, and the inlet channels 33 are connected to a pump inlet 34 while the outlet channels are connected to a pump outlet 36. Check valves 37, 39 respectfully control the flow of the pumped fluid into and out of pump 100. A single set of check valves 37, 39 is associated with each piston 11. Each channel 33, 35 communicates with a pressure chamber 41. Each piston 11 is carried in a lined cylinder 29 in the pump body 13. In conventional fashion, the pistons 11 are caused to travel reciprocally in the lined cylinder 29 by the design and camming action of the camming surface of swashplate 25 which is rotatively driven by the driveshaft 27.

Driveshaft 27 is adapted to be rotatively driven by a suitable power source known in the art. Swashplate 25 preferably forms part of and rotates with driveshaft 27. A cluster bearing 45 is operatively positioned between swashplate 25 and each piston 11. The head end 31 of each piston 11 is adapted to abut a corresponding cavity 47 integrally formed in the material comprising cluster bearing 45. As swashplate 25 rotates under the influence of driveshaft 27, the lower surface of cluster bearing 45 rides on the upper thrust bearing surface of swashplate 25, imparting a vertical acceleration component to each piston 11 through corresponding cavity 47. As swashplate 25 rotates in chamber 23, each piston 11 is driven upward to expel pressurized fluid through outlet channel 35.

During operation of the pump, the counterclockwise rotation of the swashplate 25 above the unidirectional tapered land thrust bearing cluster 10 will facilitate the generation of a pressurized load-bearing hydrodynamic film of sufficient thickness between the back surface 49 of the swashplate 25 and the corresponding surface of bearing cluster 10. Generally, this pressurized load-carrying hydrodynamic film results from the flow of fluid through the slots 24 and tapered sections 14 of each bearing pad 12 in the bearing cluster 10 during its counterclockwise rotation.

Specifically, as the back surface 49 of swashplate 25 rotates counterclockwise over cluster bearing 10 as viewed in FIGS. 1 and 2, fluid from fluid feed slots 24 migrates to the space formed between each tapered surface 14 and back face 49 of swashplate 25. As the fluid advances along tapered surface 14 toward flat surface 16 under the influence of the rotating swashplate, a pressurized hydrodynamic film of steadily decreasing thickness, and thus of increasing strength, is formed in the direction toward flat surface 16. This pressurized hydrodynamic film then advances to the space between flat surface 14 and back face 49 of swashplate 25, where the fluid pressure acts as a bearing between the rotating swashplate 25 and the flat surface 14 of cluster bearing 10, which causes separation between the swashplate and the cluster bearing. The design of the cluster bearing 10 is to develop a fluid film of sufficient hydrodynamic pressure and thickness to support the higher loads of positive displacement pumps having nine or more pistons. As described above, each of the bearing pads 12 is profiled to provide a convergent lubricant path that permits the development of a load-carrying hydrodynamic pressure zone along the length of the tapered portion 14 as the swashplate 25 rotates in the direction of decreasing film thickness.

Although the foregoing detailed description of the present invention has been described by reference to a single exemplary embodiment, and the best mode contemplated for carrying out the present invention has been herein shown and described, it will be understood that modifications or variations in the structure and arrangement of this embodiment other than those specifically set forth herein may be achieved by those skilled in the art and that such modifications are to be considered as being within the overall scope of the present invention. Therefore, it is contemplated to cover the present invention and any and all modifications, variations, or equivalents that fall within the true spirit and scope of the underlying principles disclosed and claimed herein. Consequently, the scope of the present invention is intended to be limited only by the attached claims.

We claim:

1. A high pressure positive displacement swashplate pump, the pump comprising:

a pump housing;

inlet means communicating with an inlet pressure chamber means in said pump housing;

outlet means communicating with an outlet pressure chamber in said pump housing;

means for supplying fluid to said inlet means;

said housing including a plurality of cylinders therein communicating with said inlet means and said outlet means;

piston means including pistons reciprocally moveable in said cylinders, each piston having an upper pressure surface at one end thereof moveable to a position adjacent a corresponding inlet and outlet pressure chamber, each piston having a piston head at a second end thereof;

a rotating camming surface engaging each said piston head to drive said pistons reciprocally in each cylinder to force fluid under pressure to said outlet means;

a tapered land thrust bearing cluster operatively disposed in an interior pressure chamber of said pump in a recess provided in a back plate of said pump housing, said recess adapted to receive said tapered land thrust bearing cluster adjacent to a back surface of the rotating camming surface, said tapered land thrust bearing cluster including a plurality of associated bearing pads integral therewith; and said bearing pads each including a tapered surface which develops a pressurized hydrodynamic bearing film of variable thickness between said tapered surface and said back plate of the rotating camming surface.

2. The pump according to claim 1 wherein said tapered land thrust bearing cluster is a single-piece construction.

3. The pump according to claim 1 wherein said bearing pads each include an associated flat surface, and an associated fluid feed slot operatively connected to said tapered surface.

4. The pump according to claim 3 wherein the tapered surface has a tapered rise of 1.5 degrees.

5. The pump according to claim 3 wherein said tapered land thrust bearing cluster and said fluid provide a pressurized load-carrying hydrodynamic film between said cluster bearing and said back plate of the rotating camming surface.

6. The pump according to claim 3 wherein the tapered surface of each bearing pad extends upward in a constant taper angle from the fluid feed slot to the flat surface.

7. The pump according to claim 3 wherein the tapered surface of each bearing pad is rectangularly shaped.

8. The pump according to claim 6 wherein the tapered land thrust bearing cluster is circular and includes an inner diameter and an outer diameter, and the surface rise caused by the tapered surface is uniform at the inner diameter and outer diameter of the tapered land thrust bearing cluster.

9. The pump of claim 5 wherein the rotation of said camming surface in the presence of said fluid provides a convergent lubricant path that develops a hydrodynamic pressure zone over the area of the surface.

10. In combination with a positive displacement pump comprising a swashplate having a rotating camming surface engaging a plurality of pistons, the improvement comprising a tapered land thrust bearing cluster adapted to provide a dynamic support for the swashplate opposite the camming surface, the land thrust bearing cluster comprising:

a substantially circular thrust bearing cluster body;

a plurality of bearing pads integral with said bearing cluster body;

each said bearing pad including a tapered surface, a flat surface, and a fluid feed slot operatively associated with each other;

wherein rotation of the swashplate induces the formation of a hydrodynamic lubricating film between the swashplate and each of the pads.

11. The tapered land thrust bearing cluster of claim 10 wherein said tapered surface has a tapered rise of 1.5 degrees.

12. The tapered land thrust bearing cluster of claim 10 wherein the tapered surface of each bearing pad extends upward in a constant taper angle from the fluid feed slot to the flat surface.

13. The tapered land thrust bearing cluster of claim 10 wherein the tapered surface of each bearing pad is rectangularly shaped.

14. The tapered land thrust bearing cluster of claim 10 wherein the bearing cluster is circular and includes an inner diameter and an outer diameter, and the surface rise caused by the tapered surface is uniform at the inner diameter and the outer diameter of the tapered land thrust bearing cluster.

* * * * *